United States Patent [19]

Speer et al.

[11] Patent Number: 4,469,078
[45] Date of Patent: Sep. 4, 1984

[54] AIRCRAFT ENGINE-TURBOCHARGER PACKAGE WITH BLEED VALVE CONTROL

[76] Inventors: Stephen R. Speer, S. 358 Coeur d'Alene, Apt. #6; Hugh G. Evans, W. 214 6th Ave.; James S. Christy, E. 10918 26th, all of Spokane, Wash. 99204

[21] Appl. No.: 281,944

[22] Filed: Jul. 10, 1981

Related U.S. Application Data

[63] Continuation-in-part of Ser. No. 257,864, Apr. 27, 1981.

[51] Int. Cl.³ .............................................. F02B 37/12
[52] U.S. Cl. ...................................... 123/564; 60/600; 60/605; 244/57
[58] Field of Search .................... 60/600, 601, 611; 123/564

[56] References Cited

U.S. PATENT DOCUMENTS

| | | | |
|---|---|---|---|
| 1,933,990 | 11/1933 | McGrath et al. | 123/564 X |
| 2,311,936 | 2/1943 | Elfes et al. | 123/564 |
| 2,330,650 | 9/1943 | Weiche | 123/564 X |
| 2,480,758 | 8/1949 | Mock et al. | 60/600 |
| 2,506,248 | 5/1950 | Szydlowski | 123/564 |
| 2,669,982 | 2/1954 | Schowalter et al. | 123/564 X |
| 2,875,575 | 3/1959 | Peterson | 60/601 |

*Primary Examiner*—Michael Koczo
*Attorney, Agent, or Firm*—Barry G. Magidoff

[57] ABSTRACT

In combination with an internal combustion engine and an air compressor, for use in an aircraft, the compressor providing compressed air to the engine's air inlet, there is provided a variable overboard bleed valve. The bleed valve is operated by a valve controller which controls the position of the bleed valve in response to changes in engine operating conditions. This permits maintaining optimum compressor operation over a wide range of engine operating conditions without exceeding the critical pressure of the compressor, so as to avoid surge. The controller can be preferably linked to the propeller governor and the throttle control for the aircraft, so as to move in response to combined movement of the governor and throttle control. The combined movement can be obtained using a pair of cables connected to a pivoting plate connected to the rotating control shaft of a butterfly valve.

5 Claims, 17 Drawing Figures

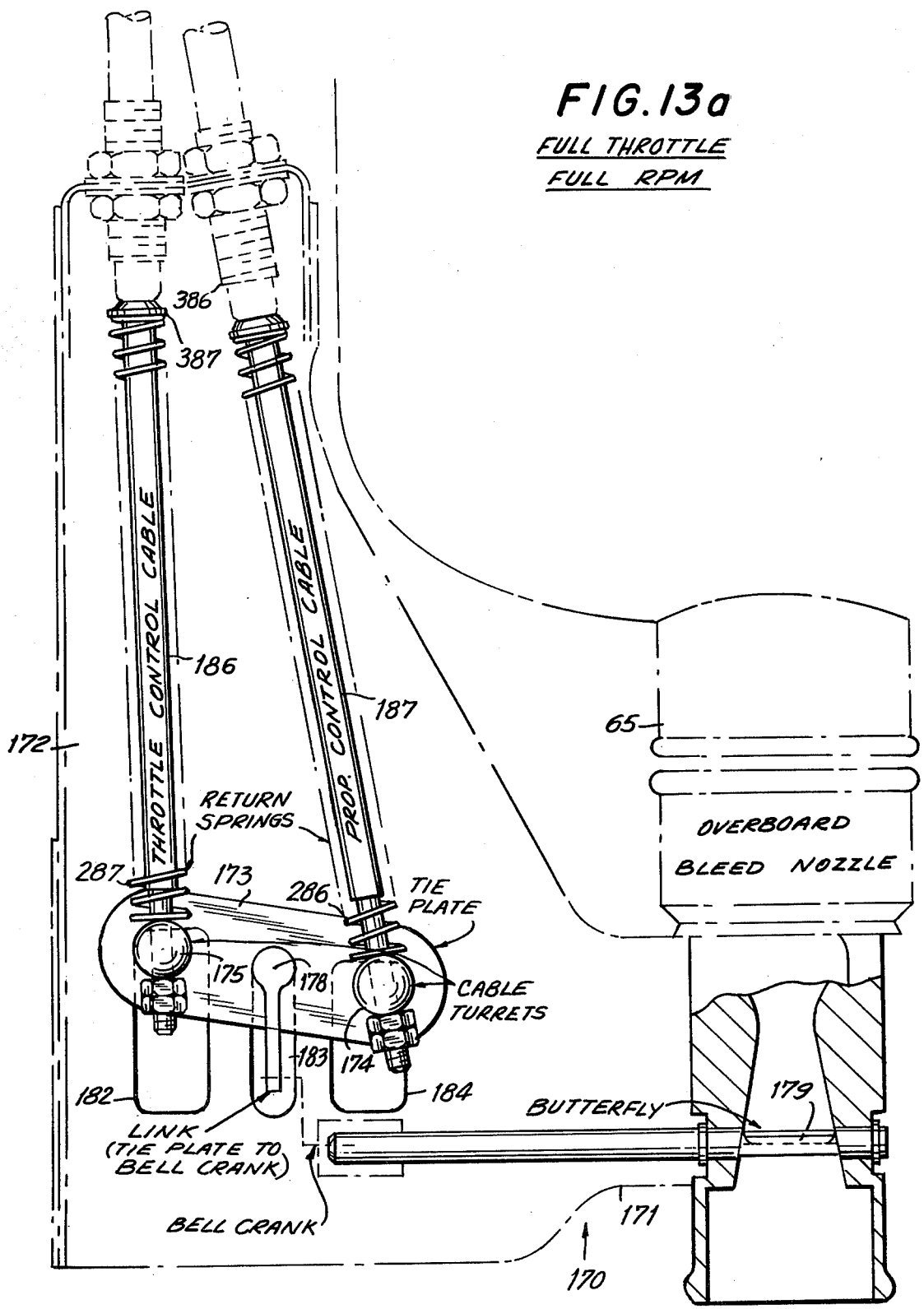

PART CLOSED THROTTLE
FULL RPM

FULL THROTTLE
MIN. CRUISE RPM

PART MIN. THROTTLE
PART MIN RPM
(FOR CRUISE)

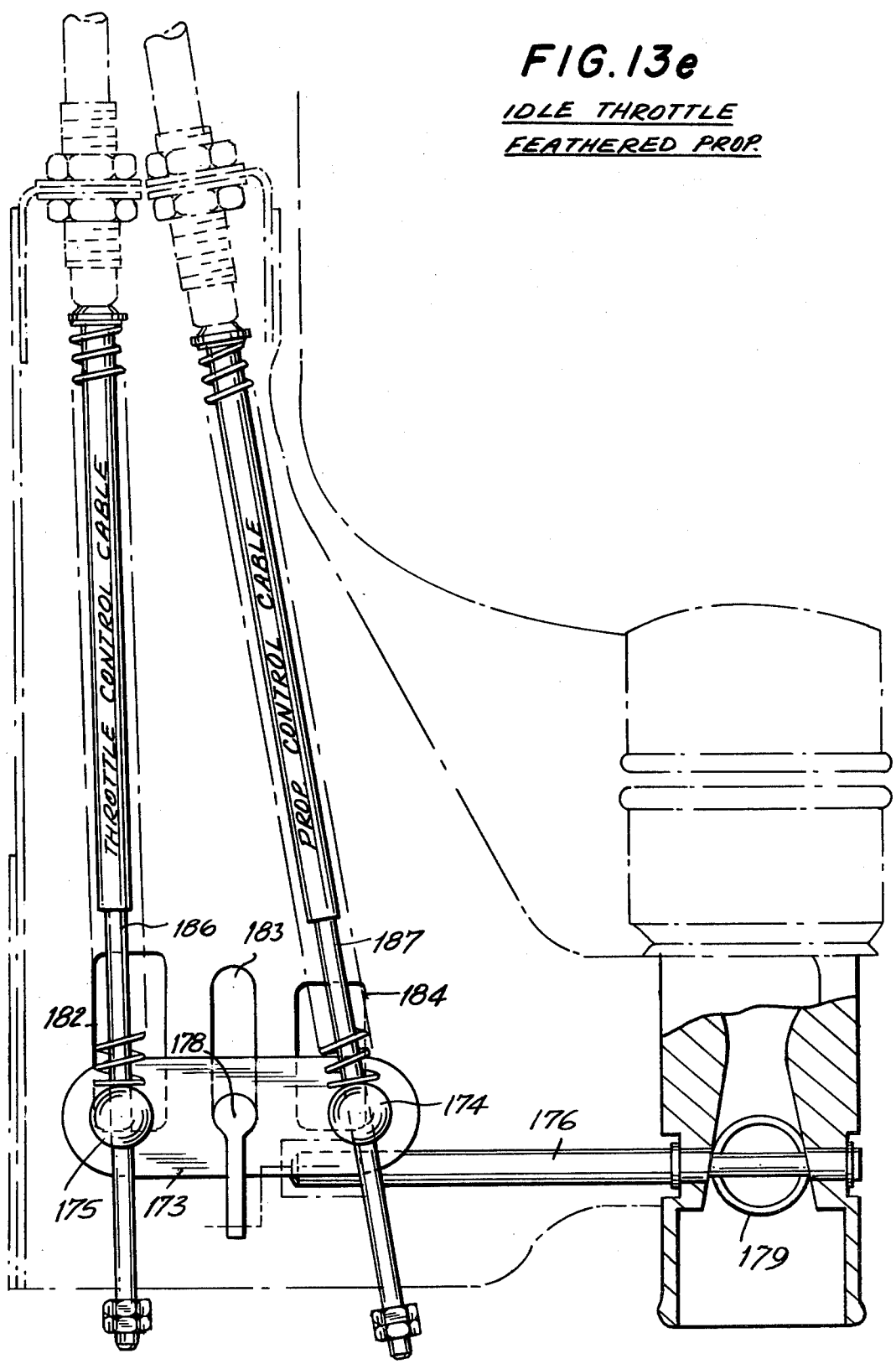

AIRCRAFT ENGINE-TURBOCHARGER PACKAGE WITH BLEED VALVE CONTROL

This application is a continuation-in-part of application Ser. No. 257,864, filed Apr. 27, 1981.

This invention relates to a turbocharged aircraft engine, and more particularly to a compact package combination of engine and turbocharger with the attendant piping connections suitable for emplacement in an available airfarme.

General aircraft industry procedure, at least within the United States, is that separate companies manufacture the engine and the airframe assemblies for a given aircraft. The airframe manufacturer must provide an engine compartment to accommodate the engine package. The engine is designed by its manufacturer in a particular configuration without optimal regard to minimal package volume and frontal area. The space limitation has, therefore, been a serious limitation to the provision of the optimally most powerful and adaptable engine for a particular aircraft.

It is further known, in accordance with general principles of physics, that in order to maintain aircraft performance at higher altitudes, a compressor means for increasing the intake manifold air pressure to the engine must be provided. The industry is presently, and for the past several years has been, using a so-called turbocharger unit to provide the necessary air pressure. Such a unit includes a power generating means which is operated by the hot exhaust gas from the engine and is of the turbine type. This power generator in turn operates the compressor, which is also a turbine and which is driven to compress ambient air to the desired manifold pressure. The larger the mass flow rate obtainable by a compressor, or turbocharger, the higher the altitude at which maximum engine output can be maintained. However, mass flow rate is generally a substantially direct function of turbocharger size, and thus comes within the limitations placed by the airframe specification. In accordance with conventionally known operating conditions, for example, a Piper Aerostar (or Sequoia, U.S. Type Certificate TC-A17WE) airframe engine cowl is conventionally supplied, without modification, with a Lycoming opposed, six cylinder, air-cooled engine, Model IO-540 Series, having a displacement of 541.5 cubic inches, connected in parallel to two Rajay turbochargers, having the capacity to deliver sea level manifold pressure at the critical altitude of 22,000 feet. In such a standard Aerostar the maximum output of the engine at the critical altitude is only 68% of the rated 290HP, at maximum RPM (of about 2575 RPM).

This package fits into an airframe engine compartment or cowl having the overall dimensions: height: 24 ins.; width: 36 ins.; and length: 47 ¾ ins., for a Piper Aerostar.

A great deal of effort has gone into attempts to increase the maximum speed and power of the Piper Aerostar, and of the commercially available aircraft as well. Such improvements should be obtained by increasing the output of the engine without increasing the overall size of the engine package, or decreasing the stability of the power plant. Thus, any improved power plant should be capable of being fitted into the existing airframe without modifying the external aerodynamic characteristics of the airframe.

Such efforts have largely been unsuccessful because of the difficulty of increasing engine output without increasing either the overall size of the engine or the overall size of the turbocharger. The industry had not considered, inter alia, the possibility of rearranging the geometry of the engine/turbocharger package, apparently because of a prejudice against changing the piping connections between the turbocharger and the engine. In the conventional engine/turbocharger package, for example, that used on the standard Lycoming engine in the Piper Aerostar, the paired Rajay turbochargers are located at the rear lower portion of the engine. It was well known that the maximum performance of the Aerostar can be improved, and the critical altitude increased by using a larger turbocharger; however, space was not adequate within the engine compartment to merely permit the increasing of turbocharger size.

Similarly, it was also recognized that merely increasing the frame size, or mass flow rate, and maximum pressure ratio of a turbocharger can create serious stability problems for general aviation use. For example, certain high altitude specialists designed record setting airplanes utilizing high pressure ratio compressors having a high mass flow rate capacity. Such high altitude airplane was intended to be operated at maximum output for relatively short flying times, and within these parameters was successful. However, for general aviation use, where it was neither safe nor efficient to continuously operate at a single maximum power level, such a package was not satisfactory without further modification.

In the past, such special aircraft were modified for general use by, inter alia, bleeding off a portion of the compressed air through a bleed orifice, or nozzle, located between the compressor and engine. This resulted in a substantial sacrifice in performance, but it could assure that the engine would at all times operate on the stable side of the surge line on a compressor "map", or plot of discharge pressure-to-ambient pressure ratio versus mass flow rate for a compressor.

Relatively stable pressurization at higher altitudes could be achieved by using two or more relatively low pressure compressors, e.g., a compound pressure device including a a blower linked in series to a turbocharger. This is an expensive and complex way of achieving this end.

Thus, in spite of the industry's constant efforts to increase performance, both by improving the engine or the airframe, or auxiliary equipment, such as the turbocharger, the problem of increasing the maximum altitude performance for a given airframe and engine combination, while maintaining the desired cruising capability of the aircraft, was not previously solved.

The present invention first provides an improved more compact turbocharger-engine package for use on a conventional horizontally opposed engine comprising: two opposed banks of cylinders, the two cylinder banks being longitudinally offset such that a first bank ends forwardly of the second bank; an exhaust manifold for the exhaust gas from each bank of cylinders; an exhaust outlet connected between the upper portion of each cylinder, and the manifold; an air inlet manifold located at the lower rear portion of the engine; mounting means for mounting the engine to an airframe comprising at least four engine mounting pads, two formed on the engine at the lower rear corners of the engine, rearwardly of, respectively, the two cylinder banks, and two formed on the lower forward corners of the engine, each pad having a mounting surface facing in a direction substantially at right angles to the direction of the longitudinal axis, or centerline, of the engine, and an engine mount secured thereto. To this engine there is secured in combination a turbocharger comprising, in a single package, a driving turbine having a turbine inlet and a turbine outlet, and a driven compressor turbine having an air inlet and a compressor outlet, the drive turbine and the compressor turbine operating on a single shaft axis. The turbine inlet is connected to the exhaust manifold of the engine, and the compressor outlet is connected to the air inlet manifold to the engine.

In accordance with one aspect of the present invention, the improvement comprises structurally connecting the turbocharger to one of said lower rear engine mounting pads, the pad behind the first cylinder bank, the turbocharger being connected adjacent to and rearwardly of the engine mount, the axis of the turbine and compressor at a slight angle to the centerline of the engine, generally not more than about 15°, and preferably not more than about 10°. It has been found, surprisingly, that by configuring the turbine in relation to the engine in this fashion, a far more compact combination of the turbine and the engine can be obtained, such that a larger volume, or mass flow rate, turbine can be used with a given engine in a given airframe. The compressor is preferably connected to the inlet manifold via an air cooling heat exchanger, generally known as an intercooler.

Preferably, the turbocharger is secured to a unitary, rearwardly extended portion of a rear engine mount, through a bracket assembly and conventional bracket plate with an arcuate cut-out portion having bolt holes formed adjacent the arcuate edge. This bracket plate conforms to the standard coupling between the turbocharger and engine, as presently available. Preferably, there is also present a modified exhaust wastegate system, to permit varying the output of the compressor by controlling the exhaust gas flow through the drive turbine. The wastegate valve is preferably automatically controlled by pressure-sensing means at the air inlet manifold. For this invention, such pressure-sensing system preferably includes, alternatively, a variable "density controller" type of control means, or the combination of a pre-set density controller means plus a "differential" pressure controller, acting in combination with the density controller. Operation of each individual element of these systems is conventional and does not form a part of the present invention.

As a further aspect of the improvement of this invention, there is provided a variable bleed system for pressurized air, located between the compressor output and the engine intake manifold, and most preferably located downstream of a compressed air heat exchanger, or intercooler. This variable bleed system includes means for varying the bleed opening in accordance with changes in the operation of the engine.

The exhaust gas piping and the air inlet piping must be suitably arranged to conform to the position of the turbocharger in accordance with the present invention. The exhaust gas tubing, which extends from along the top of each side of the opposed horizontal engine, is not symmetrical, in accordance with this invention, because the turbine is located closer to one side of the engine than to the other. Accordingly, for example, if the turbocharger is connected to the right rear engine mounting pad, the exhaust gas tube from the right bank of cylinders is shorter, and more direct, than the exhaust gas tube from the left bank of cylinders which extends transversely behind the rearward portion of the engine.

The compressed air tubing, which is connected, in the present configuration, at the upppermost portion of the turbine (the exhaust gas inlet and compressed air outlet ducts opening upwardly), preferably is connected to an heat exchanger device, or intercooler, to cool the compressed air. The cooled air is then fed to the induction sump manifold located at the lower rear of the engine. A controller manifold, to which the density controller is, or the density and differential pressure controller are, connected, is located between the intercooler and the induction sump manifold.

In the accompanying drawings, an example of an advantageous embodiment of the apparatus in accordance with the present invention is set forth. The apparatus is shown and described in schematic terms, often in an essentially symbolic manner, because of the conventional nature of the major portion of the apparatus shown. Appropriate structural details for actual operation, where not explicitly set forth, are generally known and understood and need not be set forth in greater detail herein, as they are not part of the present invention. By eliminating the specific disclosure of such conventional apparatus, the scope and concept of the present invention becomes emphasized and clarified. Reference is made to conventionally available elements by both a generic description thereof and by a reference to a specific example, where possible, including a trade designation for a presently available device from a well-known United States manufacturer. The details of the horizontally opposed aircraft engine and turbocharger, for example, are, therefore, well known to the art and their detailed descriptions are thus readily available from other known sources.

In the drawings:

FIGS. 13a to 13e are elevation views of the overboard bleed valve control means depicting several operating positions.

Figure 1:
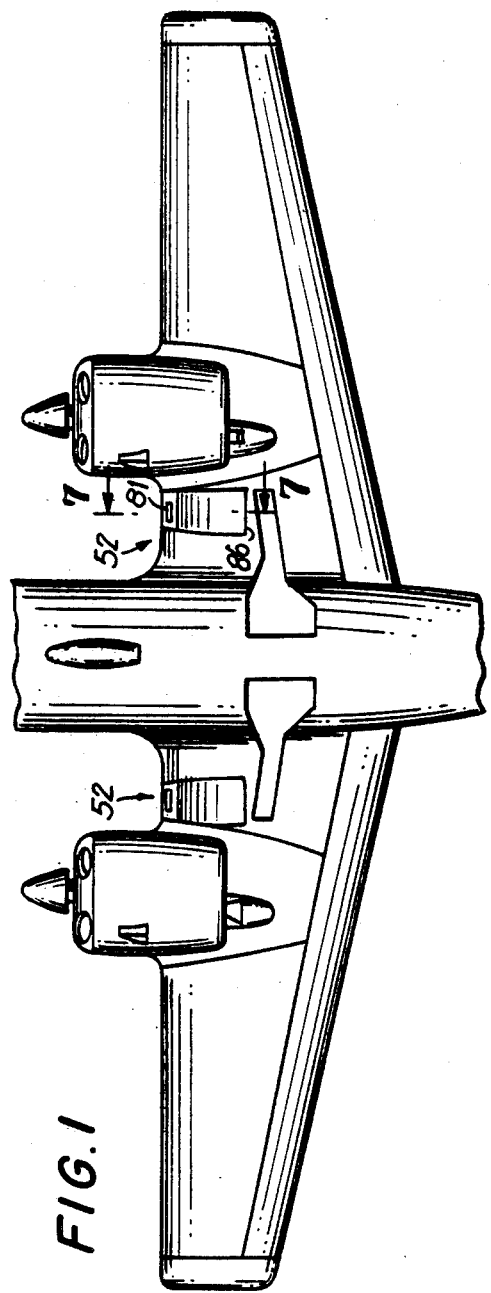
FIG. 1 is a bottom plan view of a Piper Aerostar aircraft incorporating the improvements of this invention.
Figure 7:
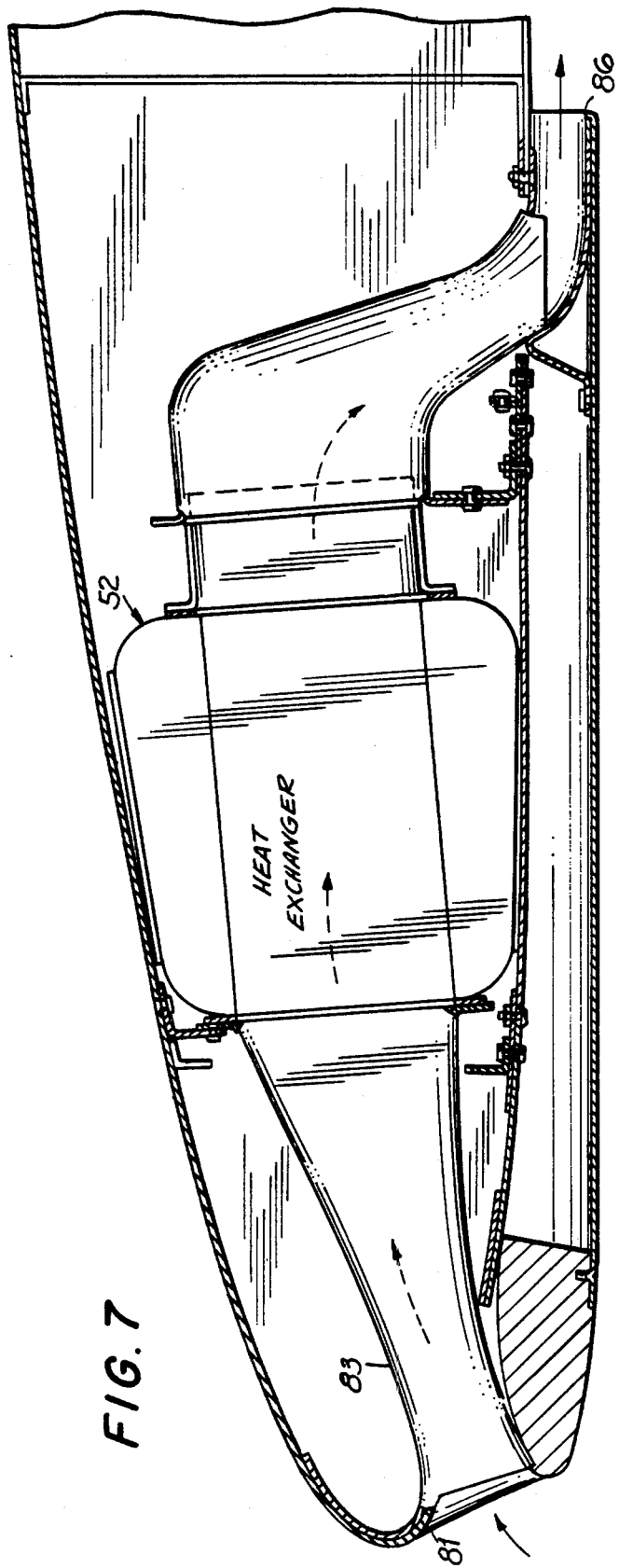
FIG. 7 is a sectional view along line 7—7 of FIG. 1, showing an intercooler on the right wing.
Figure 2:
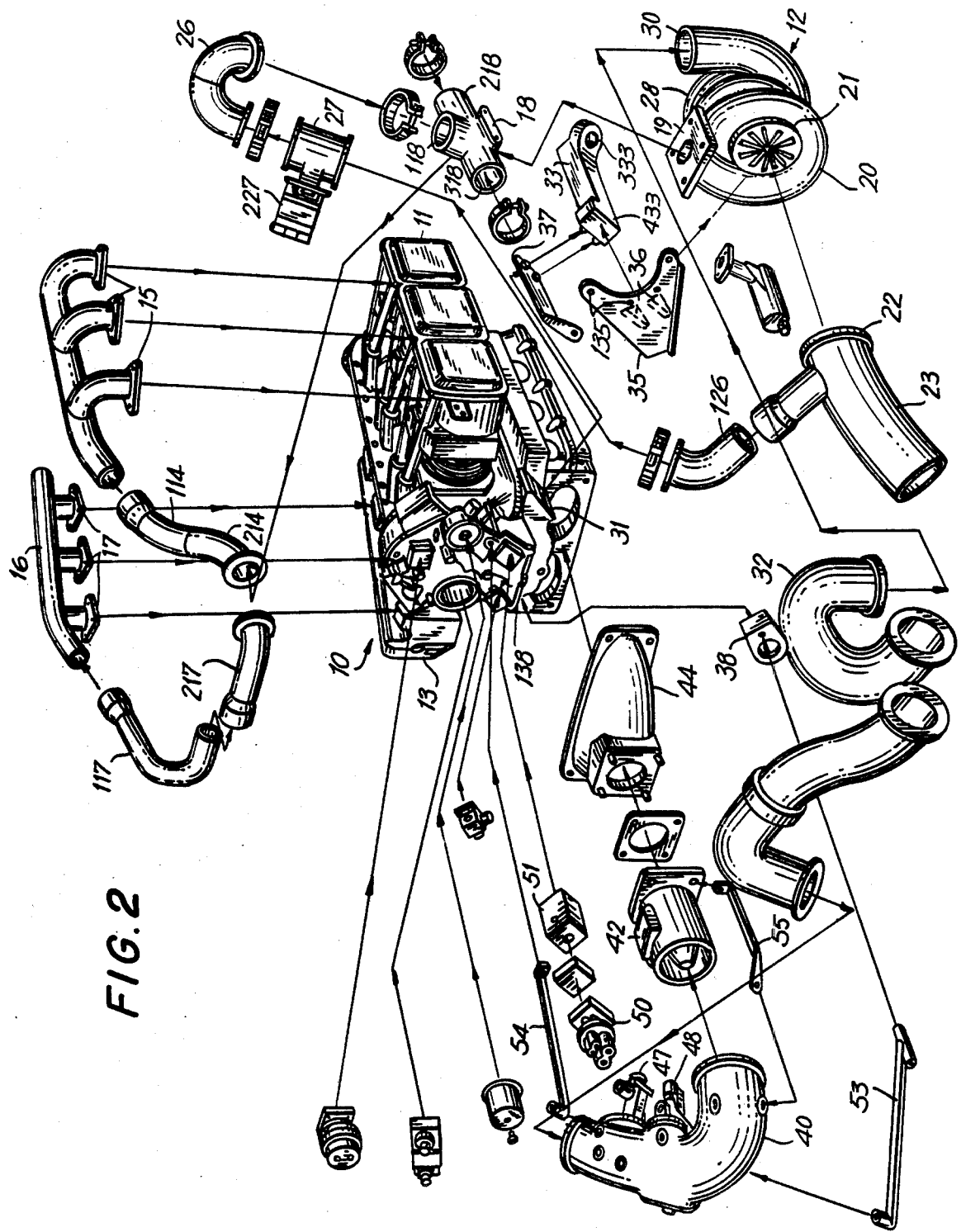
FIG. 2 is an exploded view showing one preferred embodiment of the present invention for a left wing engine.
Figure 3:
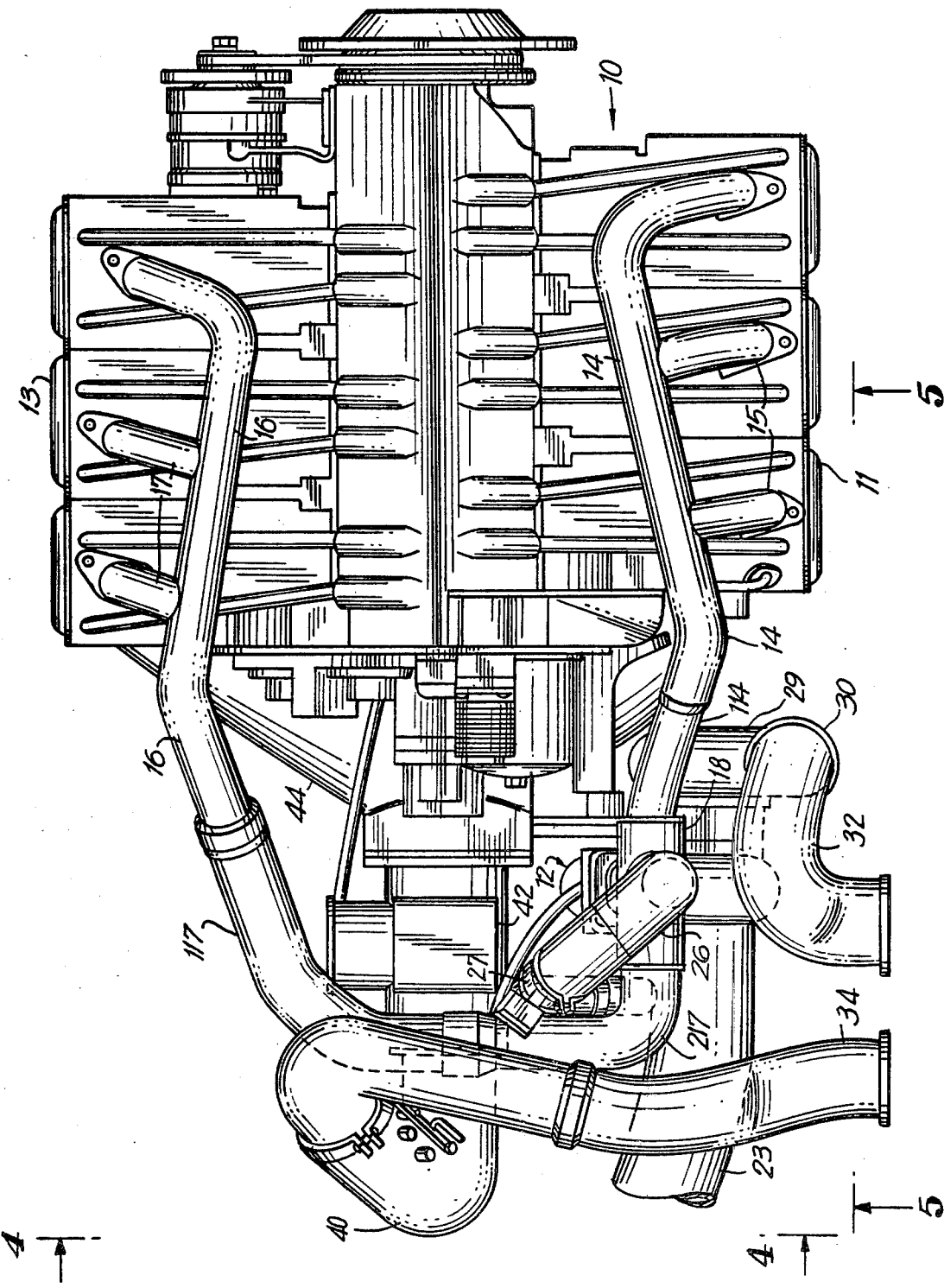
FIG. 3 is a top plan view of the preferred embodiment of this invention shown in FIG. 2 on the left side of an aircraft from FIG. 2.
Figure 4:
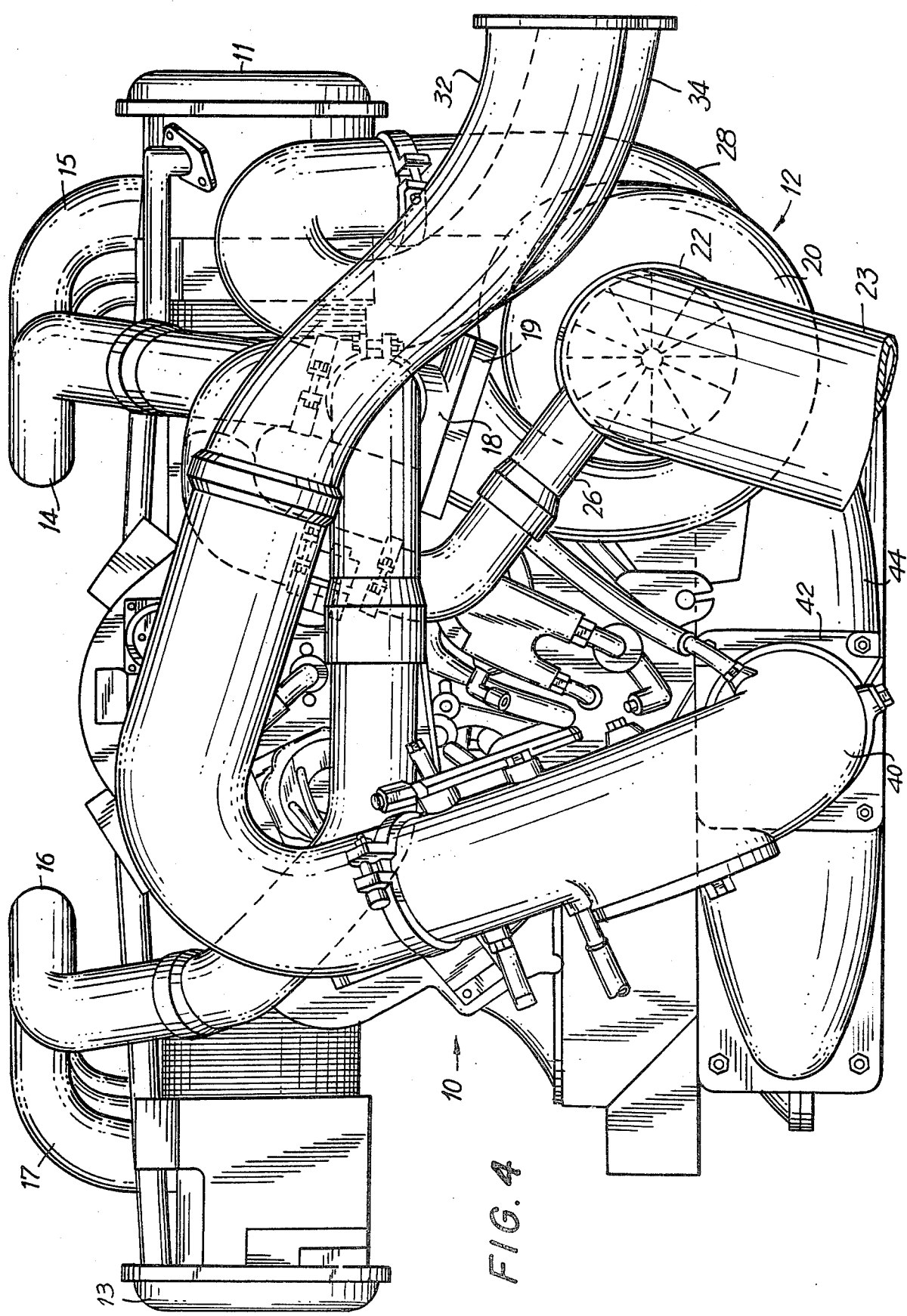
FIG. 4 is rear view of the preferred embodiment of this invention shown in FIG. 3.
Figure 5:
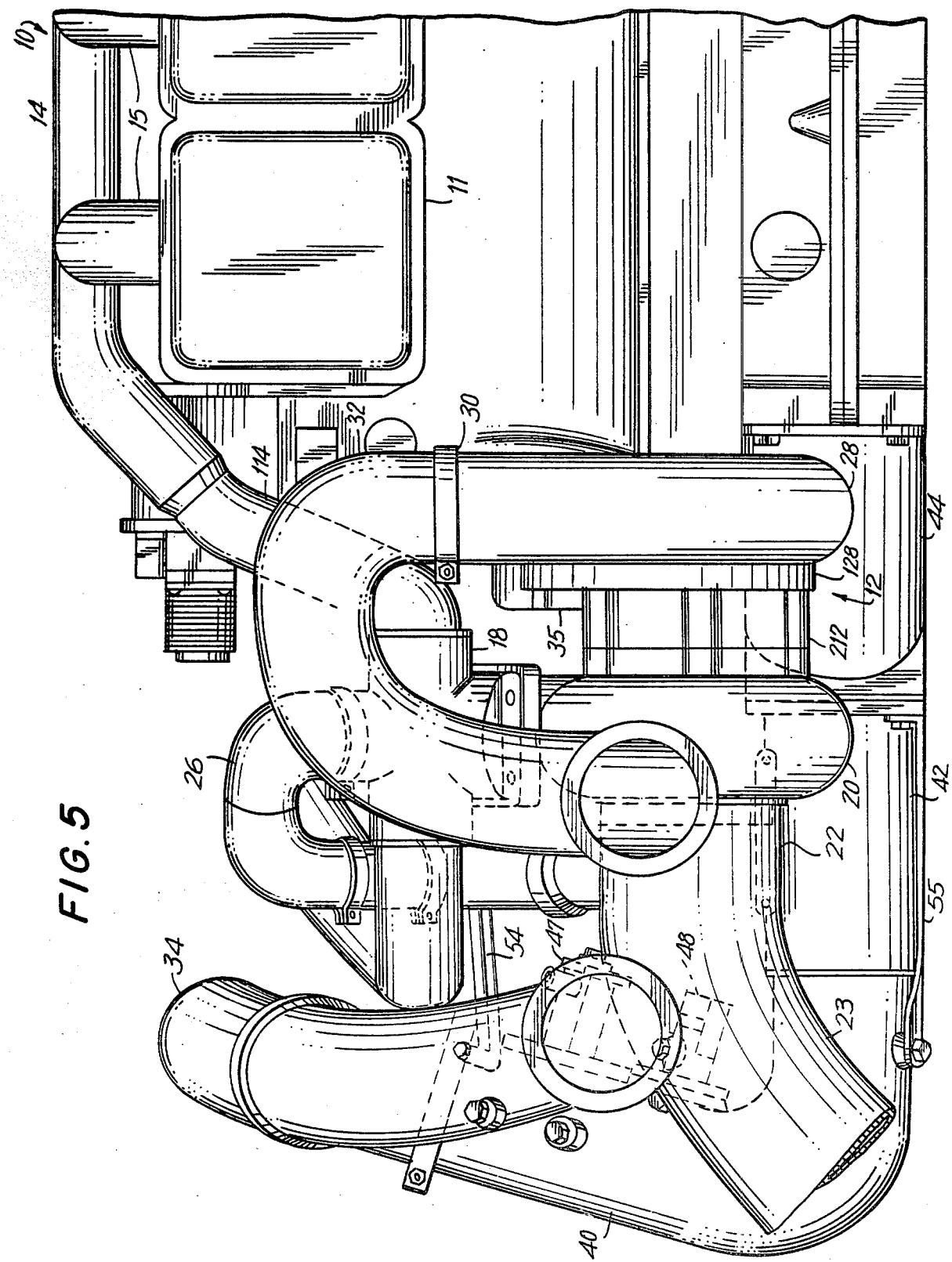
FIG. 5 is a partial side view, taken along line 5—5 of FIG. 3.
Figure 6:
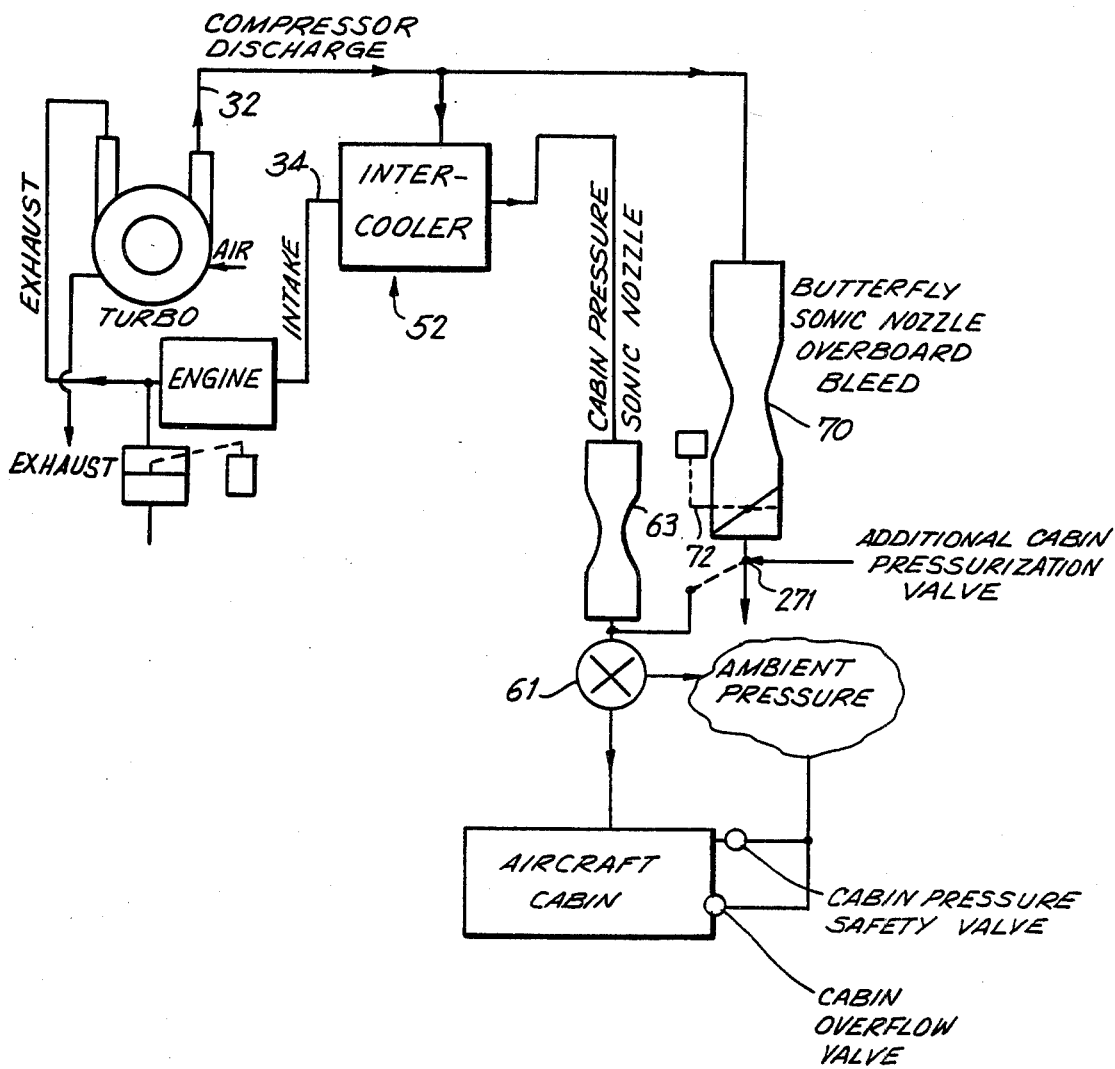
FIG. 6 is a diagrammatic air flow diagram for a preferred embodiment of this invention.
Figure 8:
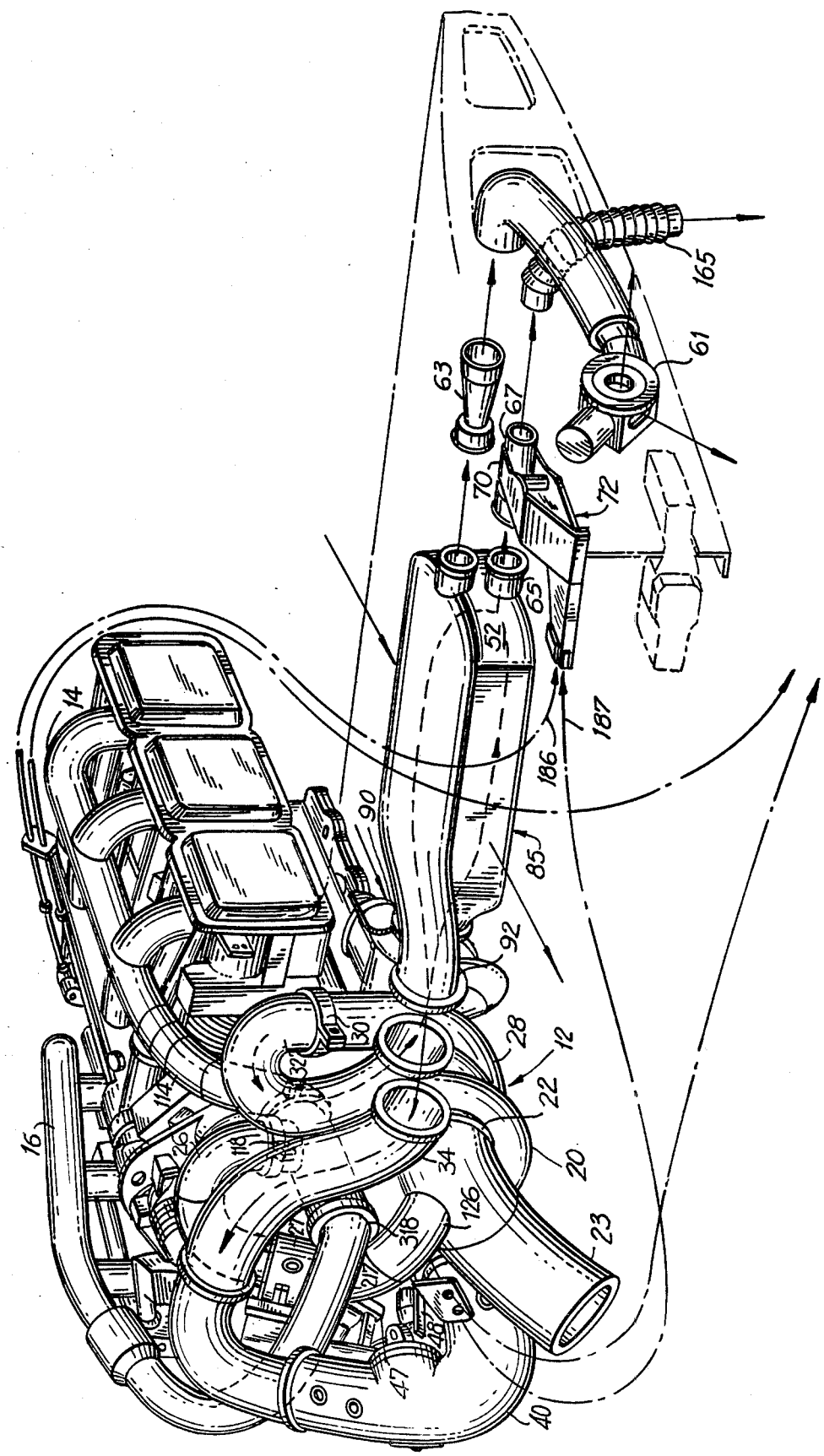
FIG. 8 is a perspective view of the piping between a turbocharger, an intercooler, and the engine manifolds for an engine on the left wing of a Piper Aerostar.

Referring to the drawings, a Lycoming nominal 350 horsepower engine, Model T10-540-J2BD, generally indicated by the numeral 10, is shown as having two banks of three cylinders each, horizontally opposed engine having a total displacement of 541.5 cubic inches. Each of the left bank of cylinders 13 and right bank of cylinders 11 is connected to an exhaust manifold. The right cylinder exhaust outlets 15 are connected to the right exhaust manifold 14 and the left cylinder exhaust outlets 17 connect to the left exhaust manifold 16.

A conventional turbocharger, for example, an AiResearch Model T-18, having a capacity or frame size, capable of providing satisfactory pressure up to a critical altitude of at least 25,000 ft. above sea level, and generally indicated by the numeral 12, is mounted on the engine on the inboard engine mounting pad 31, located at the lower right hand corner of the engine 10. The right rear mounting pad 31 faces generally in a sideways direction towards the right but angled at 45° below the central axis of the individual cylinders. A similar mounting pad is located at the left rear bottom of the engine, indicated by numeral 138. A conventional engine mount 38 is bolted to the left mounting pad 138 and is in turn intended to be secured to the airframe by conventional mounting means not shown. The right rear mounting pad 31 is bolted to the modified right engine mount 33, at the forward end of the engine mount 33, immediately behind the engine bolt opening 333. The rearward extension of the engine mount 33 includes a turbocharger mounting portion 433, which extends rearwardly of the body of the engine 10 and is unitary with the engine mount 33. Bolted to the mounting portion 433, and connected together by the same pair of bolts, are the turbocharger bracket 35 and a throttle control bracket 37. A pair of bracket ears 36 are rigidly connected to the forward surface of the turbocharger bracket 35 and extend forwardly thereof. The mounting portion 433 is bolted between the bracket ears 36 and the throttle bracket 37 is mounted behind the bracket ears 36 closest to the engine chassis 10.

The turbocharger 12 is directly bolted to and is mounted on the turbocharger bracket 35. The turbocharger comprises a drive turbine section 20 and a compressor section 28. A drive turbine 21 is located within the turbine housing 20 and a compressor turbine is located within the compressor housing 28. The turbocharger, per se, as illustrated herein, is conventional in the art and further details need not be provided herein. A shaft housing 212 is located between the turbine housing 20 and compressor housing 28 and contains therewithin a drive shaft connecting the compressor turbine to the drive turbine 21. The turbocharger 12 is mounted on the turbocharger bracket in a conventional fashion such that the arcuate portion of the turbocharger bracket 35, including the bolt hole surfaces 135, is bolted onto a mounting plate 128 formed integral with the compressor housing 28.

The axis of the shaft 212 is preferably in a parallel plane to the centerline of the engine, but extends at a slight upward angle thereto of about 10°, and preferably not more than about 15°.

Described in the accompanying drawings and in the text is the left wing engine, and accompanying piping. The right wing engine is to be identical except the intercooler installation assembly is opposite-handed, i.e., both intercoolers are mounted inboard of the engine.

In order to maintain the compact character of the turbocharger/engine combination in accordance with this invention, while simultaneously avoiding an undesirable sharp increase in the back pressure created in the exhaust system, the exhaust manifolds 14, 16 from the right and left bank of cylinders must be conformed and joined to the turbocharger drive turbine 20 in a most efficient manner. To accomplish this, the turbine drive inlet 19 is connected to a drive inlet cruciform manifold member 18 having opposing inlet positions for the exhaust gases from the left and right exhaust manifolds 16, 14. The right exhaust manifold 16 is connected to a triaxial, multiplanar, right exhaust gas downcomer tube 117 which is so configured as to extend downwardly from a position above the right cylinder bank 13 to a position essentially behind and below the upper portion of the right cylinder bank 13, and is then curved in a leftward direction to extend transversely behind the rear of the engine 10. A second biaxial, right exhaust gas tube 217 is bent in a single plane and is connected at one end to the right downcomer tube 117 and at its second end to the cruciform manifold rear port 318. The left exhaust gas manifold 14, having a shorter path to travel to the cruciform inlet manifold 18 is connected by a first downcomer tube 114, the centerline being S-shaped but in a single plane, which connects this left exhaust manifold 14 to the cruciform manifold forward port 218. The single S-shaped tube 114 can, of course, be divided into two or more sections for ease of fabrication.

The central upper opening 118 into the cruciform manifold 18 is in turn connected to a waste gas bypass tube 26 forming a portion of a helix such that the centerline of the exhaust bypass tube 26 is not in a single plane but that the downstream end of the bypass tube 26 is located rearwardly of the upstream end. The downstream end of tube 26 is in turn connected to a waste gate, or exhaust bypass, valve 27, which, e.g., can be operated automatically by a servomechanism 227 responding to changes in the inlet air presssure to the engine. The main exhaust duct 23 is connected to the exhaust from the turbine housing 20 via outlet 22 and to the waste gate valve 27 via exhaust bypass lower tube 126.

An air intake section extends from the center of the compressor, through the portion of the engine cowling forward of the compressor.

The compressed air outlet 30 from the compressor housing 28 is in turn connected to an intercooler 52 by way of an intercooler duct 32. The intercooler duct 32 forms almost one complete loop of a helix, first extending upwardly and outward (e.g. to the left in the engine of the the drawing) from the compressor outlet 30, then returning downwardly and inboard (e.g. to the right in the engine of the drawing), passing rearwardly of the compressor outlet 30 on the return and then through the wing towards the fuselage.

Figure 9:
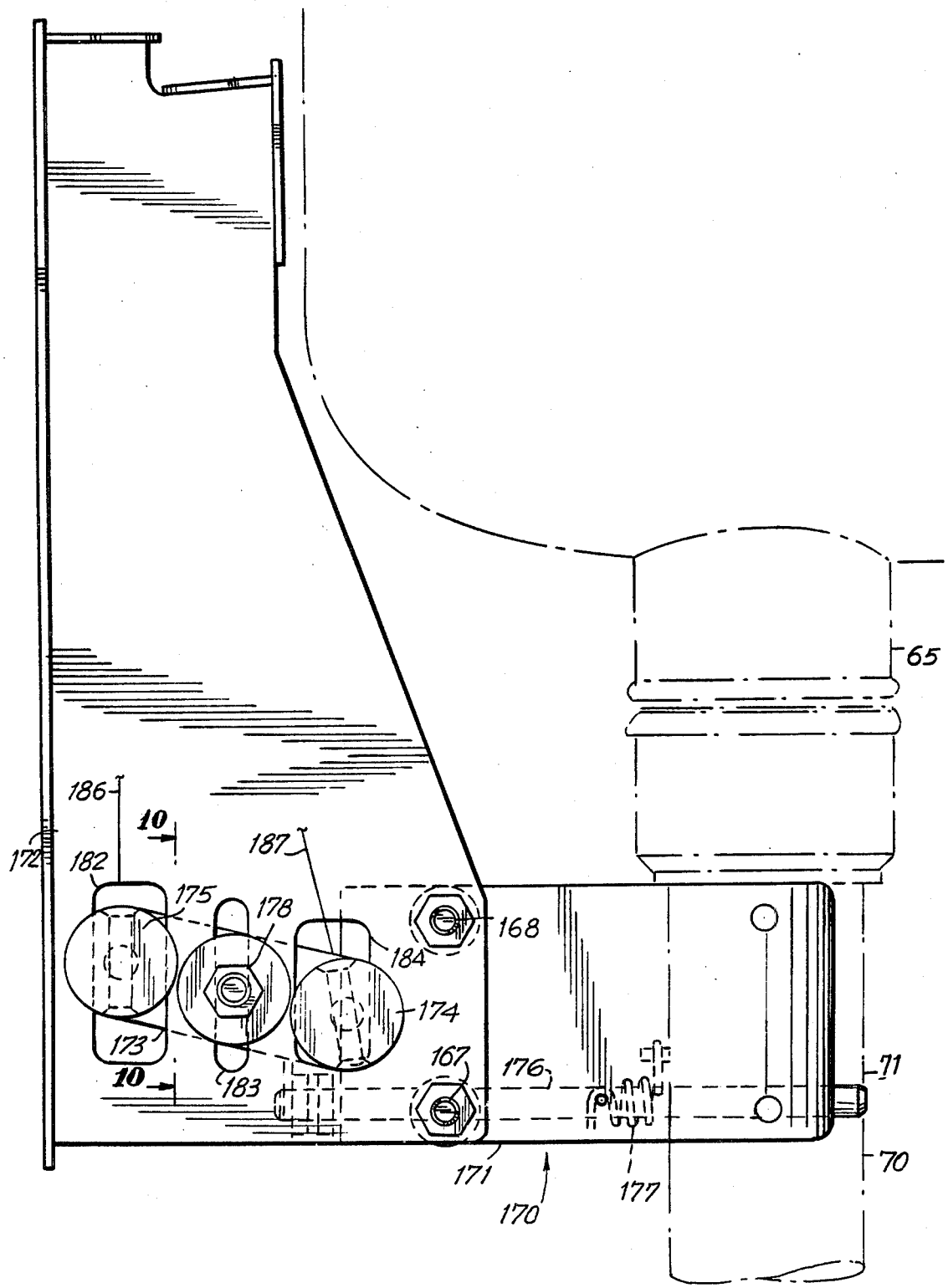
FIG. 9 is a bottom view of a mechanical control linkage for a valve for a variable bleed system on a right side engine.
Figure 10:
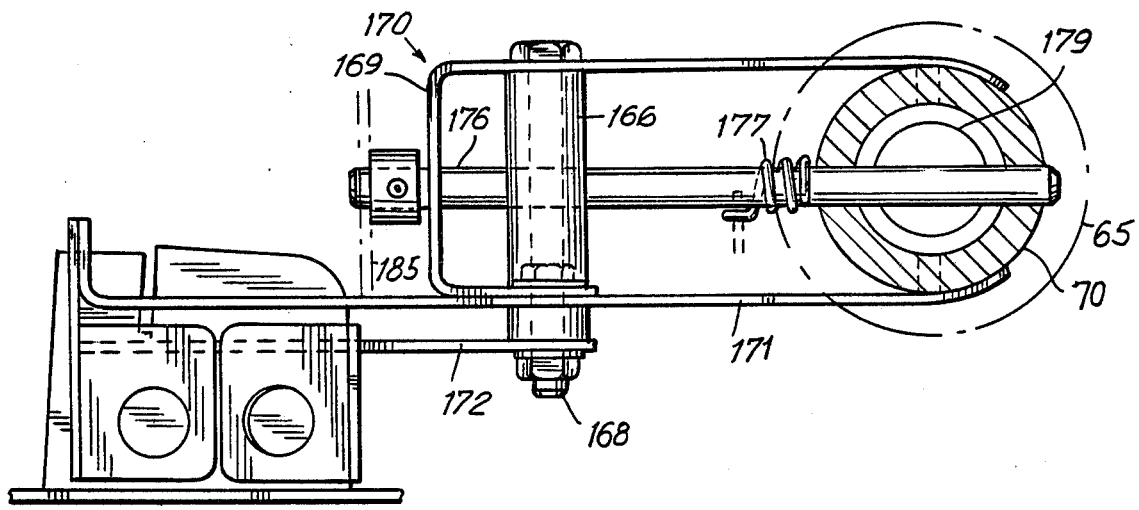
FIG. 10 is an end view of the control linkage of FIG. 9.
Figure 11:
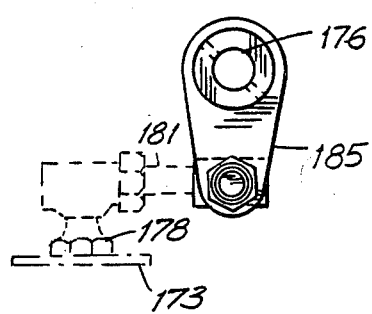
FIG. 11 is a magnified side view of the portion of FIG. 9 along line 11—11.
Figure 12:
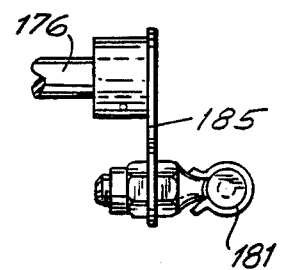
FIG. 12 is an elevation view of the portion of FIG. 11.

Branching off from the intercooler duct 32, from within the intercooler casing, is an overboard bleed line 65. A bleed butterfly valve 67, located in the bleed line 65, controls flow through the bleed line. The bleed valve 67 is in turn operatively connected, in this embodiment, by mechanical linkages, to a propeller governor and throttle control for the engine 10, as shown in FIGS. 9 and 10 and, as explained in greater detail below. Within the bleed line 65 and immediately upstream of the bleed valve 67 is a bleed sonic nozzle 70. Exit duct 165 leads from the bleed valve 67 and exhausts to the atmosphere through an opening in the bottom surface of the wing. Alternatively, where desired, a bleed cabin pressure valve 71 can direct dumped air to pressurize the aircraft's cabin.

The butterfly bleed valve 67 is operated through a servomechanism, generally indicated by the numeral 72, which in the embodiment shown in the drawings is a mechanical linkage through a pair of flexible cables, one connected to and moved by the propellor governor and the second connected to and moved by the throttle control.

As shown in FIGS. 9 and 10, a Y-shaped mounting bracket, generally indicated by the numeral 170, is secured around the exterior surface of the bleed valve 67, a J-shaped top bracket 169 is secured to the top of the valve exterior and a longer bottom bracket 171 is secured to the bottom of the valve exterior, and to the top bracket 169 by a long bolt 168, between and through both arms of the top bracket 169, and a short bolt 167. The longer bolt 168 supports a spacer 166.

A cam plate 172 is mounted on the bracket 170. A linking tie plate 173 is slidably mounted onto the cam plate 172 by threaded cable turrets 174, 175 and a tie rod 178, passing through complementary slots 184, 182, and 183, respectively. The tie rod end is rigidly and perpendicularly connected, in a single plane, to a tie rod 181, which is in turn pivotably connected to a bell crank arm 185. The bell crank arm 185 is pinned to a valve shaft 176 which extends through the end of the top mounting bracket 169, through the exterior wall of the nozzle exit 71 and across the nozzle exit channel. The valve flapper 179 is mounted on the valve shaft 176 and centered within the nozzle exit 71. The valve shaft 176 is pinned to one end of a valve return spring 177, the second end of which is pinned to the exterior of the nozzle 70, the valve shaft 176 is biased towards the position where the valve flapper 179 is perpendicular to the axis of the nozzle, i.e., effectively shutting off the bleed line 65, directing all flow from the compressor into the intercooler.

The cable 187 from the propellor governor on the engine connects to one cable turret 174, and a second cable 186 from the engine throttle control is connected to the second cable turret 175. Each cable 186, 187 also slidably passes through a collar 386, 387, respectively, which secures the cables to the cam plate 172. The two cables 187, 186 are directly connected to the governor control and throttle, respectively, such that movement of each cable is directly proportional to the movement of the governor and throttle, respectively, over the full range of movement of each cable turret 174, 175, respectively.

The tie plate 173 is generally ellipsoidal in shape, the major axis of the tie plate intersecting the tranversely aligned pivot axes of the cable turrets 175, 174 and of the tie rod 178. A bolt extends from each cable turret 175, 174, through the tie plate and through the respective cable turret slots 184, 182. The bolts being slidably held within the slots 184, 182. Each of the cable turret slots 182, 184 is sufficiently wide to permit lateral movement of the cable turret bolts as they are moved by the cables 186, 187. In the embodiments shown, the two slots 182, 184 are of equal width, equal to about twice the diameter of each turret bolt.

Helical compression springs 286, 287, secured to the cables 186, 187, respectively, and being held between a cable turret 175, 174 and a collar 386, 387, respectively, bias the tie plate 173 and thus the valve shaft 176 to the position where the valve flap 179 is in the fully closed position as shown in FIG. 13a.

The tie plate 173 can pivot about the tie rod 178 and can move linearly with the tie rod 178 in a direction parallel to the centerline of the slots 182, 183, 184 in the cam plate 172, in response to movement of the control cables 186, 187. For example, in the embodiment shown in FIGS. 13a–d, the throttle control cable turret 187 has a translational movement range of about 1.4 ins., that of the propeller control cable turret 186, about 1.1 ins. and that of the tie rod 178, and thus of the tie plate 173, about 1 in. The throttle control cable moves parellel to the centerlines of the slots 182, 183, 184 and the propeller control cable 186 moves along a line at an acute angle thereto, e.g., of about 9°.

The intercooler duct 32 is in turn connected to the intercooler heat exchanger 52 which in the case of this Piper Aerostar is located within each wing, between the engine and the fuselage. The intercooler 52 is connected to the intercooler return pipe 34 which in turn is in fluid flow connection to the air inlet control manifold 40. The manifold 40 is in turn in fluid pressure flow connection to a servo-operated butterfly valve 42 which in turn leads into the induction sump manifold 44, directly attached to the engine block 10 at the lower rear portion beneath the rear engine mounting pads 31, 138. The control manifold 40 is also secured structurally to the engine by left and right control manifold braces 53, 54 and secured to the butterfly servo unit by a manifold restraining strap 55.

Structurally and operatively connected onto the controller manifold 40 is a density controller 47 and differential pressure controller 48, which are also operatively connected to the waste gate valve servo unit 227. The density controller 47 and differential pressure controller 48 are so interconnected as to act in combination in operating the waste gate valve 27 in response to changes in conditions in the engine intake sump manifold 44. The directional valve 61 between the intercooler and the pressurized cabin of the airplane is manually operated. A cabin sonic nozzle 63 leads to the valve 61.

The engine of this invention also includes, inter alia, the normal accessories required to properly operate the engine in an airplane, including hydraulic pump 59, a scavenge pump 51 and a fuel pump 56, among others.

In designing an engine system for an aircraft in accordance with this invention, the rearrangement of the exhaust manifold in order to accommodate the modified location of the turbocharger 12 should be accomplished, as shown in the drawings, in a manner so as to minimize any effect on the operating characteristics of the engine as compared to the piping configuration used on conventional engines. It is similarly important to minimize any change in fluid flow patterns of the compressed air traveling between the compressor 28 of the turbocharger and the control manifold 40. As a further means to minimize the pressure drop between the turbocharger compressor 12 and the control manifold 40, there is provided preferably a special type of intercooler heat exchanger 52, causing a minimum pressure drop on the inlet air side, but maintaining a suitable rate of heat exchange.

The preferred embodiment of intercooler heat exchanger 52 shown in the drawings herewith is a single-pass, multiple channel, cross-flow exchanger. The cooling air enters through a slot 181 formed through the forward edge of the wing, which is connected to and opens into an intake duct 83 leading to a manifold 87 for one side of the cross-flow heat exchanger 52. An outlet duct 85 leads from the exchanger 52 through a manifold 85 to the outlet 86, opening through the bottom of the wing, approximately near the centerline of the wing. The gradual and smooth increase in the diameter of inlet and outlet ducts reduces pressure loss.

The intercooler duct 32 from the compressor 28 is connected to the lower manifold 90 for the second side of the exchanger 52 on the right wing. The upper manifold 92 of the second side of the exchanger connects to the intercooler return 34. As pressure drop is especially critical on this compressor side, the transitions between the piping 32, 34 and the upper and lower manifolds 90, 92 is especially significant.

The intercooler core has a height preferably not greater than about 45% of the wing thickness, and the inlet and outlet ducts for the cooling air are designed to minimize aerodynamic loss and thus the effect on the aircraft's performance.

The preferred intercooler can be formed of a plurality of stacked thin, flat plates interleaved with corrugated plates, the corrugations between adjacent plates are aligned such that the axes of the corrugation folds are offset 90° but are in parallel planes, such that the space between two plates are open to, e.g., the manifolds between the compressor 28 and the engine intake 40, and the adjacent space is open to the flow of ambient air through the wing, inflowing in a direction perpendicular to the compressed air flow.

This preferred type of heat exchanger is desirable because it can provide an intercooler effectiveness ($\eta$) of at least about 0.6, i.e., where $\eta = \Delta T_I/T_h - T_0$, where, $\Delta T_I$ is the temperature drop of the compressed induction air, $T_h$ is the temperature of the compressed induction air entering the intercooler, and $T_0$ is the temperature of the cooling air entering the wing.

A further advantage of the intercooler design shown is that the same unit can be used for both the left and right wings, by merely rotating the unit 180°.

The invention permits a greater range in trimming, or modifying, the frame size of the turbocharger that can be used with a given engine, without outgrowing the space provided for the engine/turbocharger combination in a particular air frame engine compartment. Thus, it now becomes possible to use a larger turbocharger for the above Lycoming TIO-540 Series engine. For example, the turbocharger which is conventionally specified for such engine, i.e., the AiResearch THO8A60, can provide a substantially constant air density at the fuel injector inlet from sea level to a critical altitude of 15,000 feet. Such a constant air density is obtained by an automatic waste gate control, similar to the waste gate 27 shown on the attached drawings, but operated from the engine oil pressure. The present invention permits the use of a larger turbocharger unit, which can provide a constant air density at the fuel injector inlet up to an altitude of 25,000 feet, also by a servo-operated waste gate valve. Although an oil pressure sensing unit can be used, the system that is defined is believed to be preferable, as providing faster reaction by the valve, and thus avoiding any undesirable surges of engine pressure, and as providing a more constant cabin pressure for a pressurized airplane. It should be noted that the AiResearch THO8 Series turbocharger can also be used in the same space provided by this invention.

A further advantage of the invention comprising the utilization of the controllable, variable bleed valve, and optimally also the intercooler and sonic nozzles, is the opportunity to further improve the pressure ratio performance of a given compressor. This can be accomplished by the optional use of previously known, but little used devices, such as inlet effusers, inlet guide vanes, variable or fixed, compressor boundary layer control elements, exit diffusers and geometric flow shaper among others. Most of these devices could not be readily used on commercially sold systems because they seriously aggravated the surge problem, creating an even steeper "surge line" or compressor stability plot of pressure ratio ("$P/P_a$") and mass flow rate ("M").

The provision of a variable bleed valve permits operation of a high performance compressor, for use when maximum performance characteristics are required, without sacrificing efficiency or safety of operation at normal cruising conditions, or when flying at lower than maximum or cruising altitudes. The sonic nozzle serves to further smooth the operation of the engine while increasing efficiency.

The maximum opening of the bleed valve, i.e., the throat of the sonic nozzle 70 in the embodiment shown in the drawings, can be empirically determined under actual flight conditions starting with the maximum operating pressure ratio of the compressor at maximum speed and altitude. The proportional inputs from the throttle and propeller governor can also be similarly empirically determined by operating at a range of throttle settings and propeller speeds. Alternative control means can include manual operation (preferably as an optional over-ride in parallel to an automatic operation of some type), or a servo-mechanism sensitive to changes in intake manifold air pressure or engine oil pressure, for example.

In operation, the turbocharger compressor 28, operated by engine exhaust gases to the turbine 20, compresses the air and sends it to the intercooler 52, a portion being bled off through the bleed valve 67, before being cooled. Cooled air leaves the intercooler 52 and passes, in part through the cabin sonic nozzle 63, and the remainder to the engine inlet control manifold 40. The connections between the propeller governor and the throttle, respectively, and the overboard bleed valve shaft is such that, e.g., when the engine is operating at ½ throttle, and at 2000 RPM, the bleed valve is 100% open. The bleed valve becomes fully closed (0%) when the engine is operating at full throttle and at maximum engine speed, i.e., 2575 RPM.

Similarly, the waste gate valve 27 is operated in response to the pressure in the inlet control manifold 40, which is in turn regulated by the inlet butterfly valve 42, leading to the inlet sump manifold 44. The inlet butterfly valve 42 is controlled by the throttle.

The operation of the overboard bleed valve is shown in some detail in the series of drawings of FIGS. 13a-e. At full throttle, and at maximum propeller speed (FIG. 13a), the two control cables 186, 187 are drawn fully inwardly, thus pulling the cable turrets 175, 174, and the tie plate 173 and crank 178, to the inwardmost end of the cam plate slots 182, 183, 184. The minor axis of the tie plate 173 is shown to be transverse to the centerlines of the slot 183, at an angle of about 13°, and the bleed valve 179 is fully closed.

Figure 13B:
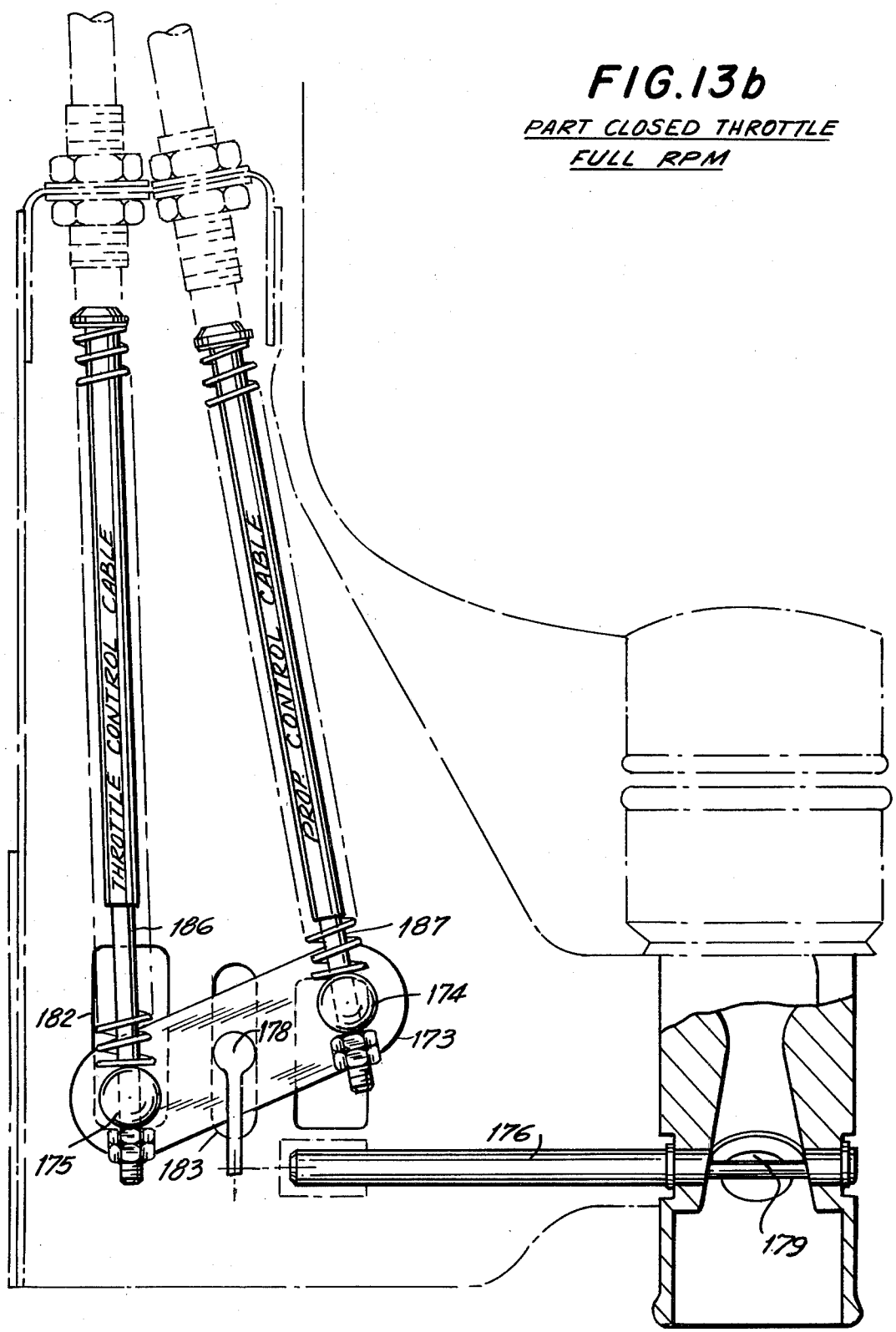
Figure 13C:
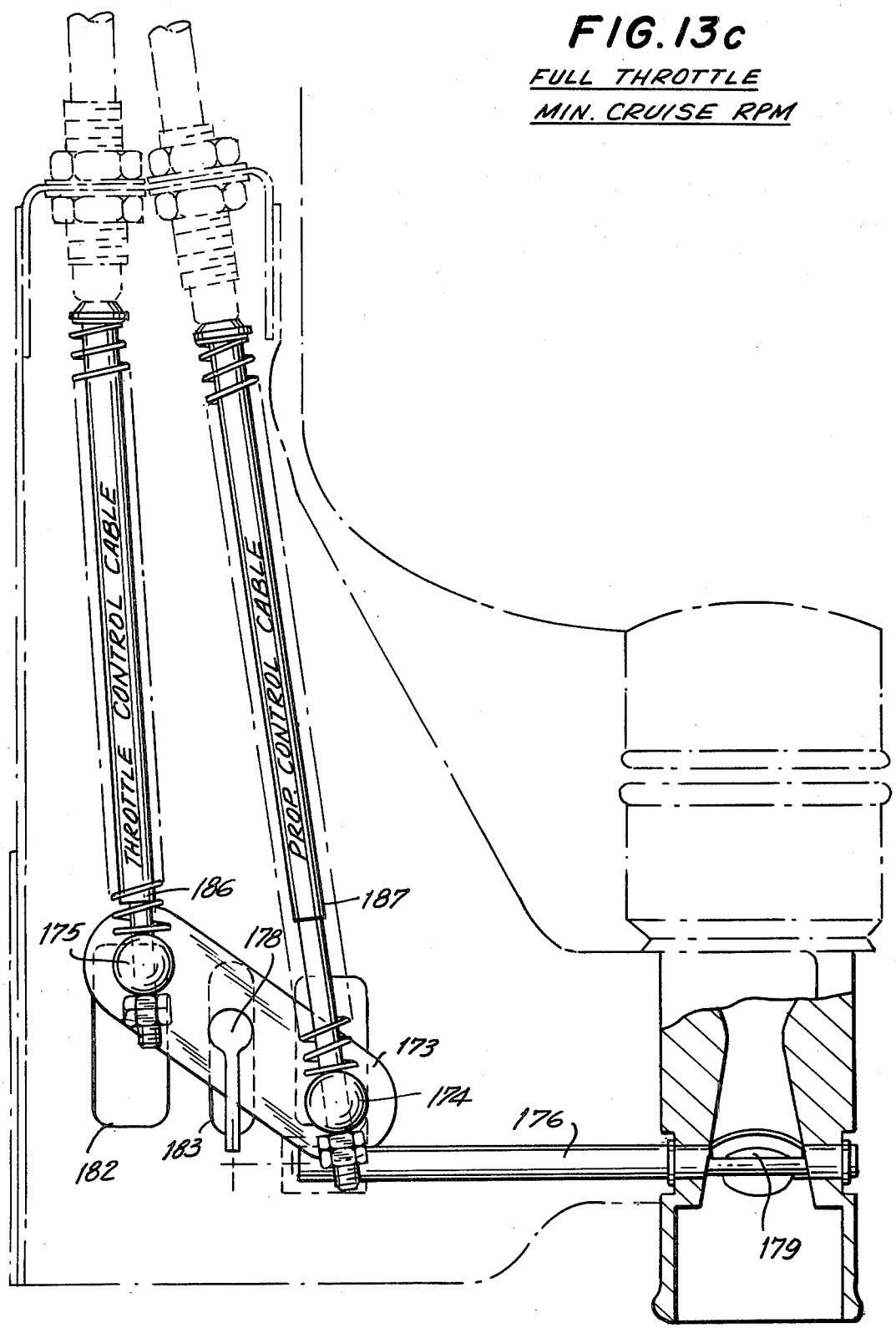
Figure 13D:
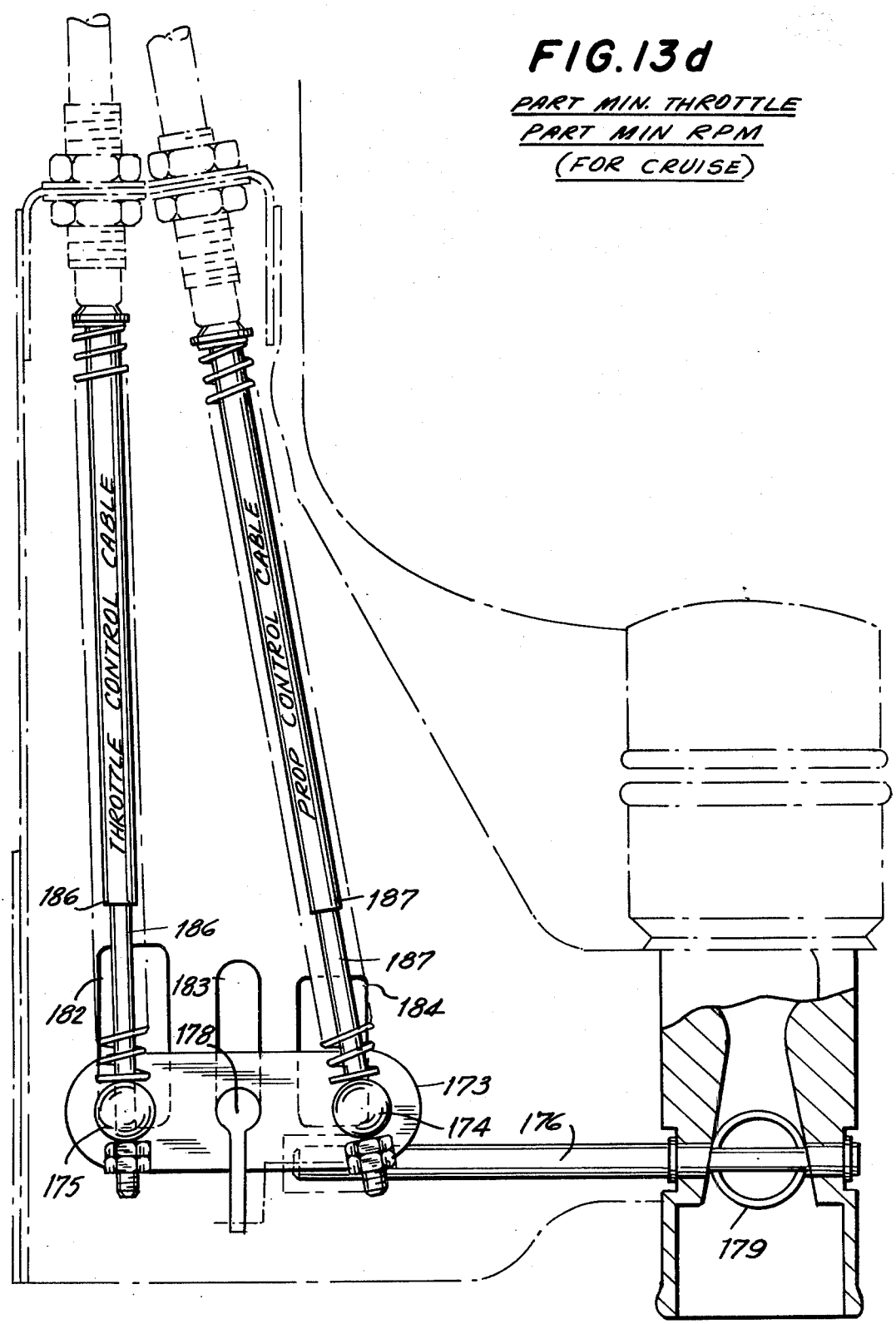

When the throttle is partly closed (FIG. 13b), but propeller speed maintained at maximum, cable turret 175 moves outwardly, the tie plate slants in the opposite direction from that in FIG. 13a and the crank 178 is moved outwardly part way along slot 183, resulting in a partly open valve 179. It should be noted that further closing of the throttle, down to idle, will have no effect on the cable turret 175 or on the valve setting. The cable 186 can be pushed outwardly so as to protrude beyond the cable turret 175, when the turret is at the outer end of the slot 182. (see FIG. 13e).

When the throttle is fully open, but propeller speed is reduced to the minimum cruise rate of about 2,000 RPM, the cable turret 174 moves outwardly almost to the outer end of slot 184, while turret 175 is at its inward end. The crank 178 is moved about half the distance to the outer end of slot 183, also moving the valve 179 to a partly open position FIG. 13c.

At low power cruising conditions, which usually are obtained at a small, partial throttle opening and propeller operating speed, both of the cable turrets are pushed to near the outer ends of the slots by the return springs 286, 287, respectively, and the crank 178 is moved near the outer end of slot 183, to almost fully open the valve 179. The minor axis of the tie plate 173 is substantially parallel to the axis of the central slot 183. From the position shown in FIG. 13d, the propeller speed can be further reduced and the propeller feathered. This is necessary in an emergency situation, when the engine is inoperative. When this is done, the cable 187 can be pushed out so as to protrude beyond the cable turret 174, when that turret is at the outer end of its slot 184, see FIG. 13e.

In this manner, the bleed nozzle is made responsive to the changing requirements of the engine with changes in the operating condition of the engine.

The patentable embodiments of this invention which are claimed are:

1. A combination of a compressor and reciprocating internal combustion engine, the combination designed for use on an aircraft, the package comprising an internal combustion, reciprocating engine having propellor governor means, throttle control means for controlling the operating of the engine, an air inlet manifold, and an exhaust manifold; the compressor having an ambient air inlet, and a compressed air outlet; and air flow connecting means between the compressor outlet and the engine inlet; the improvement comprising a variable overboard bleed valve for compressed air, located along the air flow connecting means intermediate the compressor outlet and engine inlet; and valve controller means for controlling the position of the bleed valve and responsive to changes in the engine operating conditions, the valve controller means comprising sensing means to sense movement of the governor means and of the throttle control means, and means for transmitting the movement of the governor and throttle control means to the valve controller comprising first linear movement means operatively connected to the throttle control means and second linear movement means operatively connected to the governor means, movement of the first and second linear movement means being proportional to the movement of the throttle control and governor means, respectively; tying means extending from a first end to a second end transverse to the direction of the first and second linear movement means, the first end of the tying means being connected to the first linear movement means and the second end of the tying means being connected to the second linear movement means, the tying means being capable of linear movement and pivotal movement in response to movement of the first and second linear movement means, such that linear movement of the tying means is the resultant of the combined linear movement of the first and second linear movement means; and means for connecting the tying means to the bleed valve, such that movement of the bleed valve between open and closed positions is controlled by the resultant linear movement of the first and second linear movement means, such that the bleed valve is moved upon the movement of either of the propeller governor or throttle control and in response thereto and maximum performance can be obtained from the engine and compressor over a wide range of engine operating conditions without exceeding the critical pressure of the compressor at any engine operating condition, and thus avoiding problems of surge.

2. The combination of claim 1 wherein the first and second linear movement means comprise cables.

3. The combination of claim 2 wherein the tying means pivots about an axis intermediate the cables, the axis extending perpendicularly to the length of the cables.

4. The combination of claim 1 wherein the valve is a pivoting butterfly valve, wherein the tying means is slidably and pivotally connected to the airflow connecting means, and further comprising transmission means between the tying means and the valve for converting linear movement of the tying means into rotary movement of the butterfly valve.

5. Two element bleed valve operating mechanism for a combination of a reciprocating, internal combustion engine operatively connected to compressor for providing compressed engine inlet air, the operating mechanism providing first linear movement means designed to be operatively connected to the engine to respond by moving proportionally to a change in a first engine operating condition, and second linear movement means designed to be operatively connected to the engine to respond by moving proportionally to a change in a second engine operating condition; tying means operatively connected to the first and second linear movement means, the tying means being pivotable about an axis located intermediate the connection with the first linear movement means and the connection with the second linear movement means, the axis extending perpendicularly to the direction of movement of the first and second linear movement means, the tying means being capable of linear movement and pivotal movement in response to movement of the first and second linear movement means, such that linear movement of the tying means is the resultant of the combined linear movement of the first and second linear movement means; and means for connecting the tying means to the bleed valve, such that movement of the bleed valve between open and closed positions is controlled by the resultant linear movement of the first and second linear movement means.

* * * * *